US010109125B1

(12) United States Patent
Gerace et al.

(10) Patent No.: US 10,109,125 B1
(45) Date of Patent: *Oct. 23, 2018

(54) SCANNERLESS VENUE ENTRY AND LOCATION TECHNIQUES

(71) Applicant: Flash Seats LLC, Cleveland, OH (US)

(72) Inventors: Samuel Gerace, Novelty, OH (US); Michael Rojas, North Canton, OH (US); Matthew Servant, Frisco, TX (US)

(73) Assignee: Flash Seats, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,631

(22) Filed: Feb. 16, 2017

Related U.S. Application Data

(63) Continuation of application No. 14/281,483, filed on May 19, 2014, now Pat. No. 9,600,946.

(Continued)

(51) Int. Cl.
| *G07C 9/00* | (2006.01) |
| *G06Q 10/02* | (2012.01) |
| *H04W 4/00* | (2018.01) |
| *H04W 4/80* | (2018.01) |
| *G07B 11/00* | (2006.01) |

(Continued)

(52) U.S. Cl.
CPC ......... *G07C 9/00103* (2013.01); *G06Q 10/02* (2013.01); *G07C 9/00111* (2013.01); *G06Q 20/3278* (2013.01); *G07B 11/00* (2013.01); *G07B 15/00* (2013.01); *H04W 4/008* (2013.01); *H04W 4/80* (2018.02)

(58) Field of Classification Search
CPC ............... G06Q 10/02; G06Q 20/3278; G07C 9/00103; G07C 9/00111; G07B 11/00; G07B 15/00; H04W 4/008
See application file for complete search history.

(56) References Cited

U.S. PATENT DOCUMENTS

| 8,346,580 B2 | 1/2013 | Nakfoor | |
| 2003/0229790 A1* | 12/2003 | Russell | G06Q 10/02 713/172 |

(Continued)

FOREIGN PATENT DOCUMENTS

EP 1831839 9/2007

OTHER PUBLICATIONS

Office Action for U.S. Appl. No. 14/281,483, dated Jun. 7, 2016, 26 pages.

(Continued)

*Primary Examiner* — Mohamed Barakat
(74) *Attorney, Agent, or Firm* — Knobbe, Martens, Olson & Bear LLP

(57) ABSTRACT

When attending an event at a venue, the attendee typically presents ticket information that is scanned by a venue scanner. The process associated with scanning can be dispensed with, which can improve attendee experiences, reduce costs associated with managing a venue, as well as other advantages. For example, instead of scanning a ticket at a point of ingress to the venue, a device of the user can self-scan the ticket, and then present indicia that indicates this process has occurred. The indicia can be presented to a guest services representative, who can verify that a valid ticket was redeemed by merely observing the indicia and without scanning.

26 Claims, 11 Drawing Sheets

Related U.S. Application Data

(60) Provisional application No. 61/926,147, filed on Jan. 10, 2014.

(51) Int. Cl.
*G06Q 20/32* (2012.01)
*G07B 15/00* (2011.01)

(56) References Cited

U.S. PATENT DOCUMENTS

| | | |
|---|---|---|
| 2009/0171682 A1 | 7/2009 | Dixon et al. |
| 2010/0082491 A1* | 4/2010 | Rosenblatt ............ G06Q 10/02 705/65 |
| 2010/0198626 A1 | 8/2010 | Cho et al. |
| 2011/0119743 A1* | 5/2011 | Gleim ................ H04L 63/0807 726/6 |
| 2011/0208418 A1 | 8/2011 | Looney et al. |
| 2011/0251862 A1 | 10/2011 | DeLuca |
| 2012/0091202 A1* | 4/2012 | Cohen .................... G06F 21/33 235/382 |
| 2013/0024218 A1* | 1/2013 | Fink ...................... G06Q 10/02 705/5 |
| 2013/0262163 A1 | 10/2013 | Bergdale et al. |
| 2014/0039945 A1* | 2/2014 | Coady ................... G06Q 10/02 705/5 |
| 2014/0100896 A1* | 4/2014 | Du ........................ G06Q 10/02 705/5 |
| 2014/0240350 A1 | 8/2014 | Chen et al. |
| 2015/0004935 A1* | 1/2015 | Fu ......................... H04W 12/08 455/411 |
| 2015/0088420 A1 | 3/2015 | Foster et al. |

OTHER PUBLICATIONS

Office Action for U.S. Appl. No. 14/272,170, dated Sep. 9, 2016, 41 pages.

Office Action for U.S. Appl. No. 14/272,170, dated Mar. 30, 2017, 31 pages.

Final Office Action for U.S. Appl. No. 14/272,170, dated Oct. 4, 2017, 26 pages.

* cited by examiner

SCANNERLESS VENUE ENTRY AND LOCATION TECHNIQUES

CROSS-REFERENCE TO RELATED APPLICATIONS

This application is a continuation of, and claims priority to U.S. patent application Ser. No. 14/281,483 filed on May 19, 2014 and entitled, "SCANNERLESS VENUE ENTRY AND LOCATION TECHNIQUES," which claims priority to U.S. Provisional Application Ser. No. 61/926,147 filed on Jan. 10, 2014 and entitled, "MECHANISMS FOR IMPROVING VENUE EVENT EXPERIENCES." The entireties of these applications are incorporated herein by reference.

TECHNICAL FIELD

This disclosure generally relates to facilitating entry to a venue without the need to manually scan a ticket or other information, which can be accomplished by leveraging location techniques such as, e.g., audio-based signals.

BACKGROUND

When attending an event held at a venue such as a concert or sporting event, it is customary that each attendee is greeted at a point of ingress by a guest service representative, where a ticket or other indication of a privilege to enter the venue is verified. Typically, this verification is accomplished by the guest services representative who, using a scanner of some type, scans the ticket or ID of the attendee. Upon successful authorization, the guest services representative then allows the attendee entry to the venue. Such might be in an open entryway or one regulated with access-limiting devices such as turnstiles or the like.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to scannerless venue entry. A proximity component can be configured to receive data that indicates the system is within a defined distance range from a point of ingress to a venue. A redemption component can be configured to identify ticket data representing a privilege to enter the venue in response to the proximity data. A presentation component can be configured to instruct a user interface to present verification data representing a verification that the privilege to enter the venue was validated The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
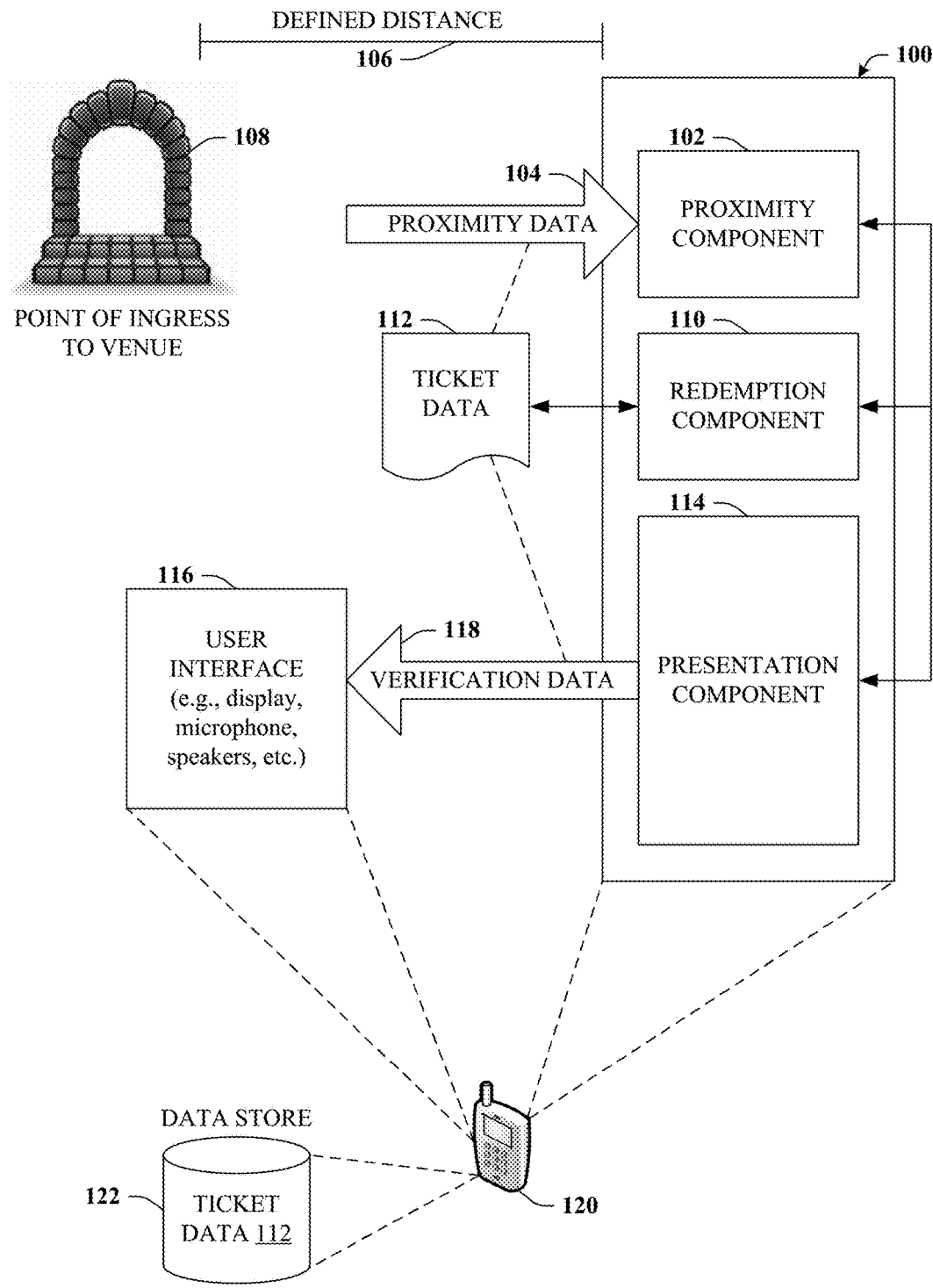
FIG. 1 illustrates a block diagram of an example system that can provide for scannerless venue entry in accordance with certain embodiments of this disclosure.

As used herein, the term "scannerless" is used in connection with ticket information and/or entry to a portion of a venue and refers to verification of access to the portion of the venue that is not dependent on the ticket information being scanned by a guest services representative or other venue employee. The subject matter described broadly relates to various techniques or mechanisms that can be utilized in connection with events (e.g., live events) held at a venue (e.g., stadium, arena, amphitheatre, theme park, etc.). These techniques or mechanisms can be ticketing-oriented, seating-oriented, location-based, or the like; and can be directed to enhancing efficiency, available features, commemoration, conservation, incentives, security, or the experiences associated with event attendees (e.g., a ticket purchaser), event performers (e.g., artists, athletes, etc.), event hosts (e.g., venue owners, operators, etc.), event vendors or sponsors, or other suitable parties or entities.

Historically, event attendees typically appeared at the event with a ticket. Recently, an alternative model, denoted herein as "Flash Seats®," was introduced, which associated a ticket purchase or other contractual right to enter an event or venue with a user account. This association with a user account has led to numerous advantages in connection with the domain and is, in some implementations, assumed in connection with concepts or embodiments disclosed herein. As one example advantage, because of the association with a user account, entry to the venue can be gained by producing at the gate an ID of some type rather than a barcode or ticket. Therefore, as used herein the term "ticket" is intended to refer to data relating to a privilege to enter, including conventional ticket data as well as ID-based data such as that utilized by Flash Seats® embodiments. The ID can be a conventional driver's license, passport, credit card, but can also relate to data stored on a user device such as a visual image, voice signatures or other signatures, an audio-based signal or watermark, device ID, individual ID, biometric data such as a fingerprint, retina, or DNA, etc. The device that stores such data (referred to herein as an "attendee device") can be any suitable device such as a smart phone, tablet, wearable device, or the like.

As introduced above, when attending an event held at a venue such as a concert or sporting event, it is customary that each attendee is greeted at a point of ingress by a guest service representative, where a ticket or other indication of a privilege to enter the venue is verified. Typically, this verification is accomplished by the guest services representative who, using a scanner of some type, scans the ticket or ID of the attendee. Upon successful authorization, the guest services representative then allows the attendee entry to the venue or event. Manually scanning tickets of venue attendees represents a significant expense and might lead to inconvenience for attendees, for example, when lines form.

Efficiencies associated with validating a potential attendee's privilege of entry can be enhanced by enabling scannerless entry, wherein it is not necessary for the guest service representative to spend time scanning data provided by each and every attendee. For example, the attendee device is capable of maintaining data associated with a ticket, which can be leveraged to allow the device to effectively self-scan the ticket instead of ticket data being scanned by the guest service representative associated with the venue.

As one example, an application executing on the attendee device can receive proximity data that indicates the device is near to a point of ingress to the venue, and optionally time data associated with a start time of the event held at the venue, which can be compared with a current time. Proximity data can be based on any suitable technique or technology and can be transmitted via passive or active techniques. For example, proximity data can be based on GPS or other triangulation techniques, device-based geolocation, Bluetooth, radio frequency identification (RFID), wireless location, near field communication (NFC), light-based or audio-based signaling techniques, magnetic-based signaling techniques, and so on. Additionally or alternatively, proximity data can be based on input from a user of the device such as the user provides input indicating he or she is at the venue and wants to redeem the ticket.

In response, the application can cause a user interface (e.g., a display, speakers, etc.) associated with the device to present certification data representing the device has redeemed a valid ticket or otherwise certified a privilege of entry to the venue. This presentation can be a defined background or other image, possibly including a watermark, certificate of authentication (COA), a code of the day, etc. Additionally or alternatively the presentation can be a sound clip that plays, which might also include an audio COA. Thereafter, the attendee might simply present the device (that is presenting the indicia) to a guest service representative who can quickly verify the presentation without the time and/or resource-intensive process of scanning a ticket. The guest services representative can quickly verify the correct elements are being presented by the attendee device and allow entry without the need to scan.

In some embodiments, proximity data can be received based on detection of an audio signal. For example, points of ingress to the venue can include audio beacons or transmitters that produce an identifiable audio signal, which need not necessarily be audible to human sensory perception. Upon detection of this audio signal, the attendee device can provide proximity data to the application. Such a technique has many advantages. For example, audio signals can be detected with hardware (e.g., a microphone) that is near-universal among attendee devices and therefore can be utilized in connection with a very large set of devices, even those without access to GPS or other location-based software or equipment and can be utilized with very little battery drain. In addition, many location-based techniques rely on a functioning communication networks, many of which are prone to congestion, poor quality of service, or unavailability when many thousands of people are clustered in a small area, such as at a venue during an event. Therefore, techniques that rely on a network connection can have reduced viability that is not an issue for audio signaling techniques. Furthermore, audio signals can be precisely configured for specified ranges at particular locations, such as point of ingress to the venue. Additionally or alternatively, equipment for producing audio (or other types) of signals can be situated at various locations within the venue to facilitate location services such as guidance or navigation, proximity-based alerts, and so forth.

Furthermore, "ticketless" embodiments can exist in which either a venue device or an attendee device (e.g., smart device, RFID dot, etc.) can facilitate identification. Such identification can be based on biometric data, facial recognition techniques, or the like. Moreover, attendee devices can operate as passive signaling devices (e.g., RFID dot, etc.) or active signaling devices (e.g., very low power active signals such as watch battery powered RFID or Bluetooth-based, etc.).

In some embodiments, the device of the attendee can operate as an audio signaling device similar to the functioning of the venue transmitter devices. For example, the device can present an audio signal that appropriately certifies a privilege of entry instead of requiring a scanner device to scan visual indicia such as a ticket, ID, barcode, etc.

In some embodiments, a single attendee device can manage and/or verify privileges of entry to the venue for multiple attendees. In some embodiments, the subject matter disclosed herein can be utilized in connection with exit scanning that determines an attendee is exiting the venue.

Exit scanning can provide data that is not typically available to many conventional approaches Example Systems for Scannerless Venue Entry and Location Techniques Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing the subject disclosure.

Referring now to FIG. 1, a system 100 is depicted. System 100 can, inter alia, provide for scannerless venue entry, which can be employed in connection with existing barcode approaches or with Flash Seats® ID approaches. In either case, an attendee acquires (e.g., purchases) a ticket to an event held at a venue, and associated information is stored on an attendee device (e.g., attendee device 120) such as a mobile phone or wearable device. System 100 and/or attendee device 120 can include a memory that stores computer executable components and a processor that executes computer executable components stored in the memory, examples of which can be found with reference to FIG. 10. It is to be appreciated that the computer 1002 can be used in connection with implementing one or more of the systems or components shown and described in connection with FIG. 1 and other figures disclosed herein. As depicted, system 100 can also include proximity component 102, redemption component 110, and presentation component 114, which are further detailed herein.

Upon arrival at a venue, potential attendees are typically met at the gate or other point of ingress (e.g., point of ingress 108) by a guest services representative equipped with a scanner of some type. With this scanner, the guest services representative will typically scan the tickets of incoming attendees. The scanner device can be in communication with an access control server (ACS) that can verify that the information scanned relates to a valid ticket and that the ticket has not already been redeemed. It is understood a given venue can have multiple points of ingress 108 and point(s) of ingress 108 can be substantially any location or area where venue attendees gain access to portions of the venue. For example, point of ingress 108 can be a main entry gate to the venue or to a parking area or an entry point to a specific section (e.g., VIP lounge) of the venue. As explained, point of ingress 108 will typically be populated with one or more guest services representatives, who, in other approaches use scanners to scan ticket data for each attendee prior to allowing the attendee entrance to the venue. However, in accordance with the described subject matter, the guest services need not perform any scanning. Thus, one or more points of ingress 108 can be designated for self-scanning and the associated guest services representatives do not need to scan information provided by attendees and need not be equipped with a scanning device at all.

In that regard, proximity component 102 can be configured to receive proximity data 104. Proximity data 104 can indicate that system 100 (and by extension attendee device 120 as well as the attendee) is within a defined distance 106 from a point of ingress 108 to a venue. Redemption component 110 can be configured to identify and/or validate ticket data 112 representing a privilege to enter the venue. Redemption component 110 can perform this validation in response to proximity component 102 receiving proximity data 104. Hence, ticket data 112 can be redeemed once it is indicated (via receipt of proximity data 104) that the attendee is near to point of ingress 108.

Once ticket data 112 has been redeemed, presentation component 114 can be configured to instruct user interface 116 to present verification data 118 representing a verification that the privilege to enter the venue was validated. Accordingly, user interface 116 can present indicia to indicate that ticket data 112 exists and was processed/redeemed. Thus, guest services representatives at point of ingress 108, instead of manually scanning ticket information presented by an attendee, can observe user interface 116 to ensure the correct indicia associated with verification data 118 is being presented. If so, then the attendee can be allowed access to the venue via a process that is secure and more efficient than other approaches. In some embodiments, guest services representatives need not examine every attendee, but rather can employ "spot checks," whereby some portion of attendees are selected and challenged and their associated devices examined for the correct indicia. In some embodiments, guest services representatives can be prompted to select a particular attendee based on information received that indicates a conflict or a high probability of a conflict. Furthermore, guest services representatives are not required to challenge attendees at point of ingress 108, but can do so at substantially any suitable location associated with the venue.

It is understood that in some embodiments, system 100 can be included in attendee device 120, which can be a smart phone, a tablet, a wearable computer, or any other suitable device. Attendee device 120 can include a data store 122 that can retain various information, including ticket data 112 that can be accessed by system 100. Furthermore, attendee device 120 can include user interface 116 that can comprise a display, microphone, speakers, camera, input mechanisms, and so forth.

Figure 2A:
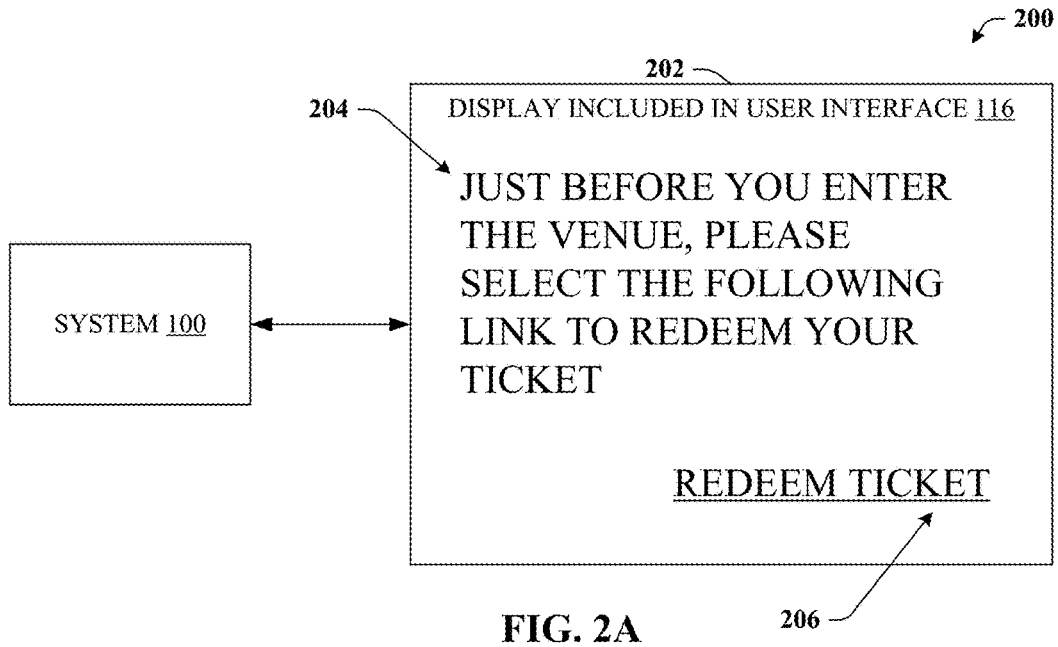
FIG. 2A provides a block diagram illustration that depicts an example presentation with regard to proximity data being triggered by user input in accordance with certain embodiments of this disclosure.
Figure 2B:
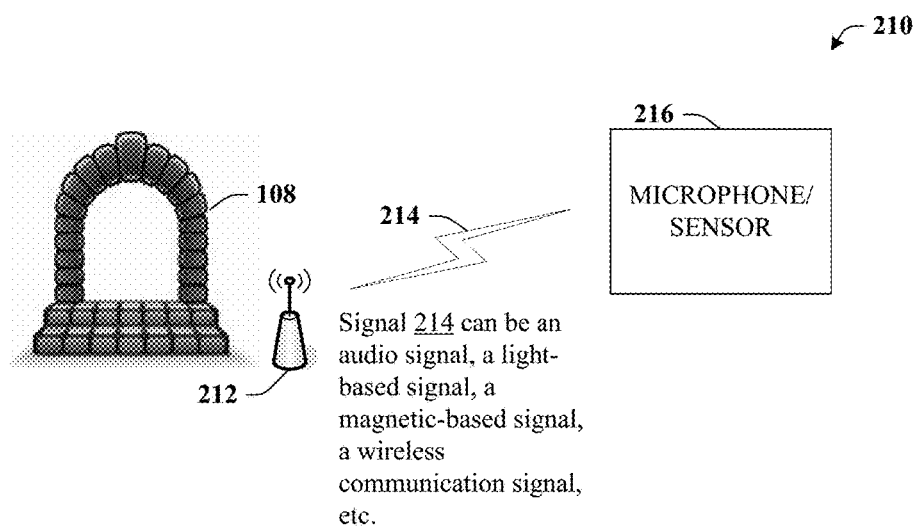
FIG. 2B provides a block diagram illustration that depicts an example presentation with regard to triggering proximity data being transmitted by a transmitter and/or being received by the system in accordance with certain embodiments of this disclosure.

Referring now to FIGS. 2A-B, illustrations 200 and 210 are provided. Illustration 200 depicts an example presentation with regard to proximity data being triggered by user input. Illustration 210 depicts an example presentation with regard to proximity data being triggered by transmitters. As detailed previously, ticket data 112 can be redeemed in response to receipt of proximity data 104. In some embodiments, proximity data 104 can be triggered based on user input. For example, the attendee can, upon approaching point of ingress 108, manually input information that indicates he or she is within defined distance 106 to point of ingress 108, an example of which is provided by Illustration 200. In this case, a display 202 included in user interface 116 can present message 204. Message 204 in this case presents the text "Just before you enter the venue, please select the following link to redeem your ticket." Display 204 also presents element 206 that can be a link to redeem ticket. By selecting element 206 (or via another mechanism), proximity data 104 can be triggered and provided to system 100. Redemption component 110 can then validate ticket data 112, and presentation component 114 can instruct user interface 116 to present verification data 118 or associated indicia, possibly via display 202. As described, a guest services representatives at point of ingress 108 can observe the presentation and allow entry to the venue.

Additionally or alternatively, in some embodiments, proximity data 104 can be triggered in response to receiving a signal 214 from a transmitter 212 associated with the venue, an example of which is provided in connection with illustration 210. This transmitter 212 can be situated near point of ingress 108 or elsewhere and can be configured to enable detection at defined distance 106, possibly based on environmental conditions, compliant equipment capabilities, or other criteria. Signal 214 can be detected by a sensor 216 that can be included in system 100 and/or attendee device 120. It is appreciated that signal 214 can be an audio signal, in which case sensor 216 can be a microphone. Such an audio signal 214 can be configured for specific ranges (e.g., defined distance 106) based on volume metrics, sound pressure metrics, or other suitable metrics and can be broadcast with a frequency that is beyond sensing capabilities of most humans, which can provide a signal without interfering with the experience of attendees. A typical human hearing range is between about 20 hertz to about 20 kilohertz, so transmitters 212 that are audio transmitters can broadcast sound that is outside of this range, e.g., below about 20 hertz or above about 20 kilohertz.

In other embodiments that can be implemented separately or together, transmitter(s) 212 can broadcast light-based signals that can be received by optical sensors 216, or be based on wireless communication standards that can be detected by an associated receiver mechanism.

Regardless of how it is determined that system 100 is in proximity to point of ingress 108 (e.g., by user input that indicates such, by transmitted signal detection, or another manner), such can trigger proximity data 104, which in turn can trigger ticket data 112 being redeemed and verification data 118 being presented by user interface 116. In some embodiments, proximity data 104 can include time data relating to a current time/date. In such cases, redemption component 110 can verify that the attendee is both near to point of ingress 108 and that it is an appropriate time for entering the venue before redeeming ticket data 112. Time data might also be used to determine when or how long user interface 116 will present verification data 118. For example, if it is long past the time in which the event at the venue begins (and/or points of ingress 108 are closed), then verification data 118 might not be presented by user interface 116.

Figure 3A:
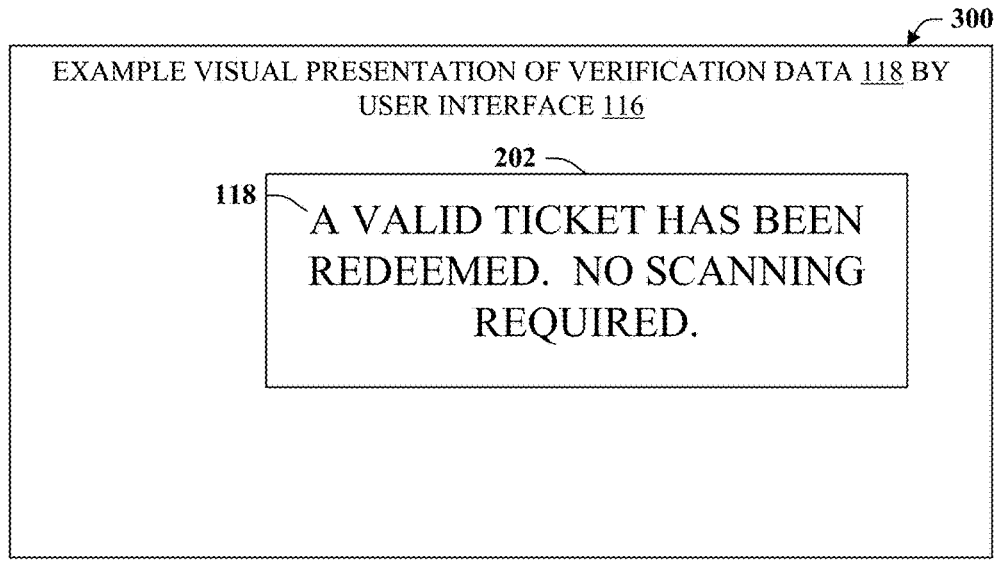
FIG. 3A provides a block diagram illustration that depicts an example where verification data is presented visually in accordance with certain embodiments of this disclosure.
Figure 3B:
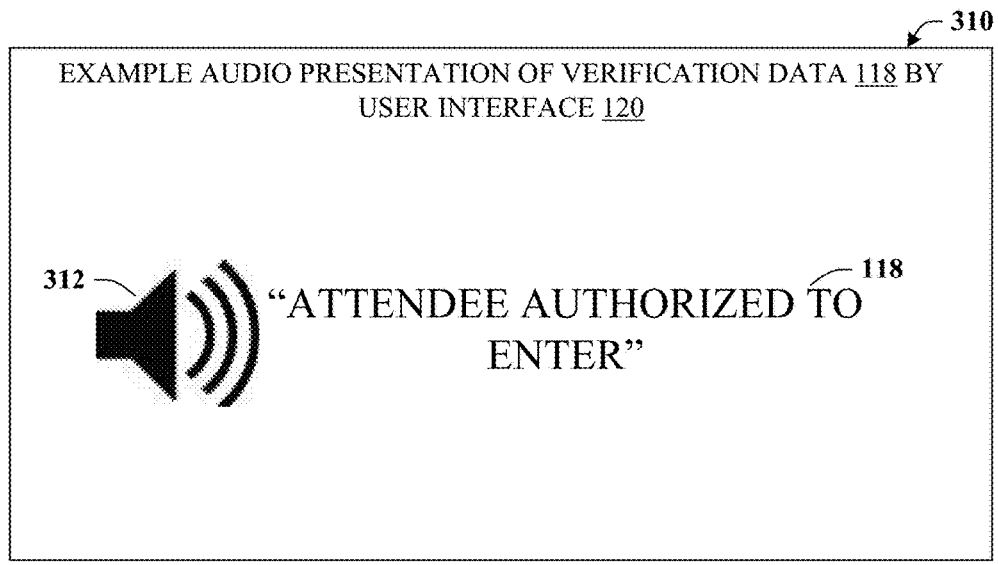
FIG. 3B provides a block diagram illustration that depicts an example in which verification data is presented in an audible manner in accordance with certain embodiments of this disclosure.

Turning now to FIGS. 3A and 3B, illustrations 300 and 310 are provided. Illustration 300 relates to an example where verification data 118 is presented visually. Illustration 310 relates to an example in which verification data 118 is presented in an audible manner. In either case, presentation of verification data 118 can be facilitated by user interface 116. For instance, illustration 300 depicts display device 202 (of user interface 116) presenting verification data 118 in the form of a visually observable message that states: "A valid ticket has been redeemed. No scanning required." This message can be presented to the guest services representative, which can be quickly verified and the attendee can be allowed entry to the venue with no scanning necessary. It is understood that the text message is merely an example, and verification data 118 can be presented in the form of an image or other visual indicia, examples of which are provided in connection with FIGS. 4A-C.

A similar procedure can occur in connection with illustration 310, but in this case presentation of verification data 118 can be formatted as an audio presentation. For instance, a speaker 312 associated with user interface 116 can transmit verbal words perhaps in a distinctive voice, in this case stating that the attendee is authorized to enter the venue. In other examples, the verification data 118 might be a music clip or a distinctive sound byte. Such can be presented to the guest services representative, who can quickly identify the sounds and allow entry.

Figure 4A:
FIGS. 4A-C illustrate various block diagram illustrations that depict several example presentations of the verification data that includes certification data in accordance with certain embodiments of this disclosure.
Figure 4B:
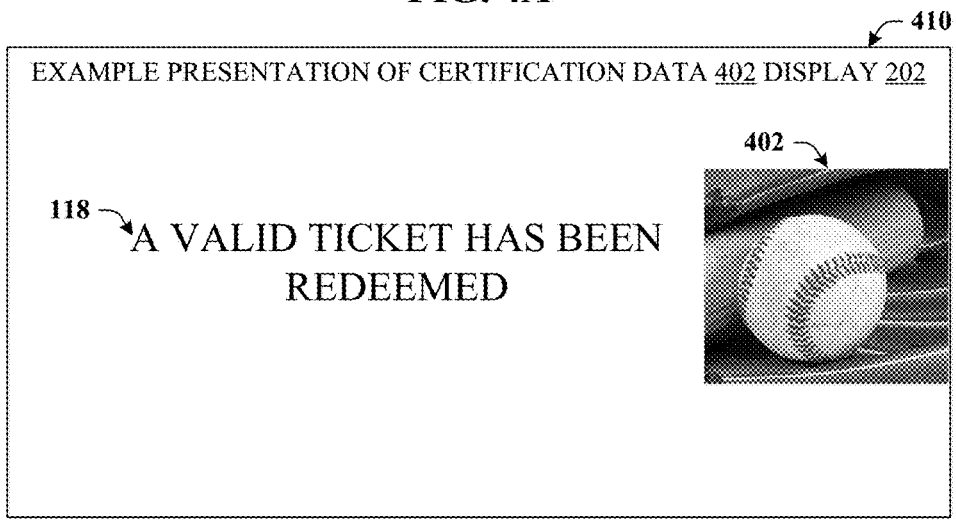
Figure 4C:
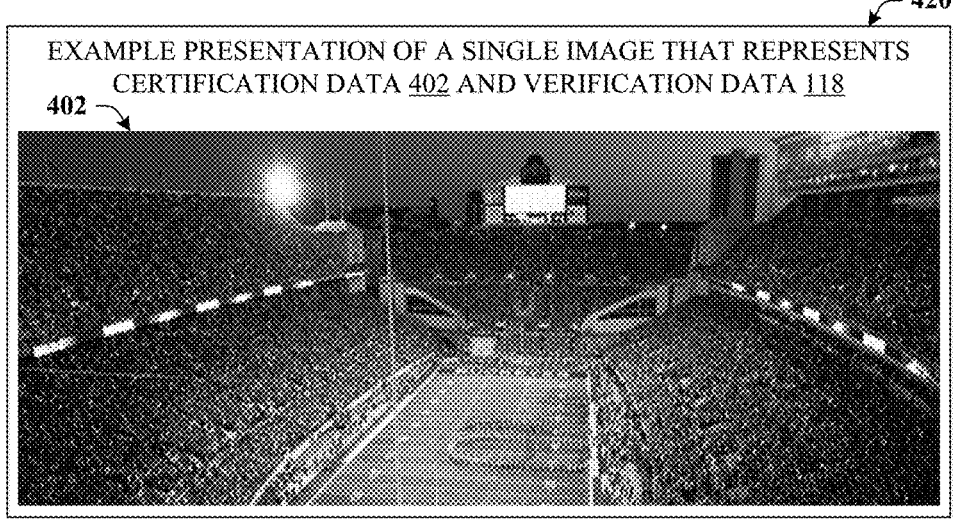

Referring now to FIGS. 4A-C, illustrations 400, 410, and 420 are provided. Illustrations 400, 410, and 420 relate to various example presentations of the verification data 118 that includes certification data 402 and/or indicia associated with certification data 402. Certification data 402 can relate to a certification that the verification data 118 (also being presented) is authentic. As one example, certification data 402 might be a word or phrase (e.g., code of the day). Presentation 400 depicts the word "Zeus" as certification data 402. Hence, when a venue representative is presented attendee device 102 that includes other verification data 118, seeing the word Zeus also displayed can represent that the other verification data 118 is authentic.

Presentation 410 provides an example in which certification data 402 is an image (e.g., a static image, an animated image, an image designed to thwart forwarding or copying, etc.), whereas presentation 420 provides an example in which certification data 402 is a background image. The above are intended to be non-limiting examples, and it is understood that certification data 402 can take many other forms and can be substantially any suitable indicia. For instance, certification data 402 might be a watermark, an audio presentation of some type or even a machine-readable code or string, which might utilize encryption aspects. It is understood that system 100 can take measures to secure certification data 402. For instance, the image of the bat and baseball in presentation 410 or the stadium image of presentation 420 might be presentable to user interface 116, but not otherwise accessible by other applications utilized by attendee device 120.

Figure 5:
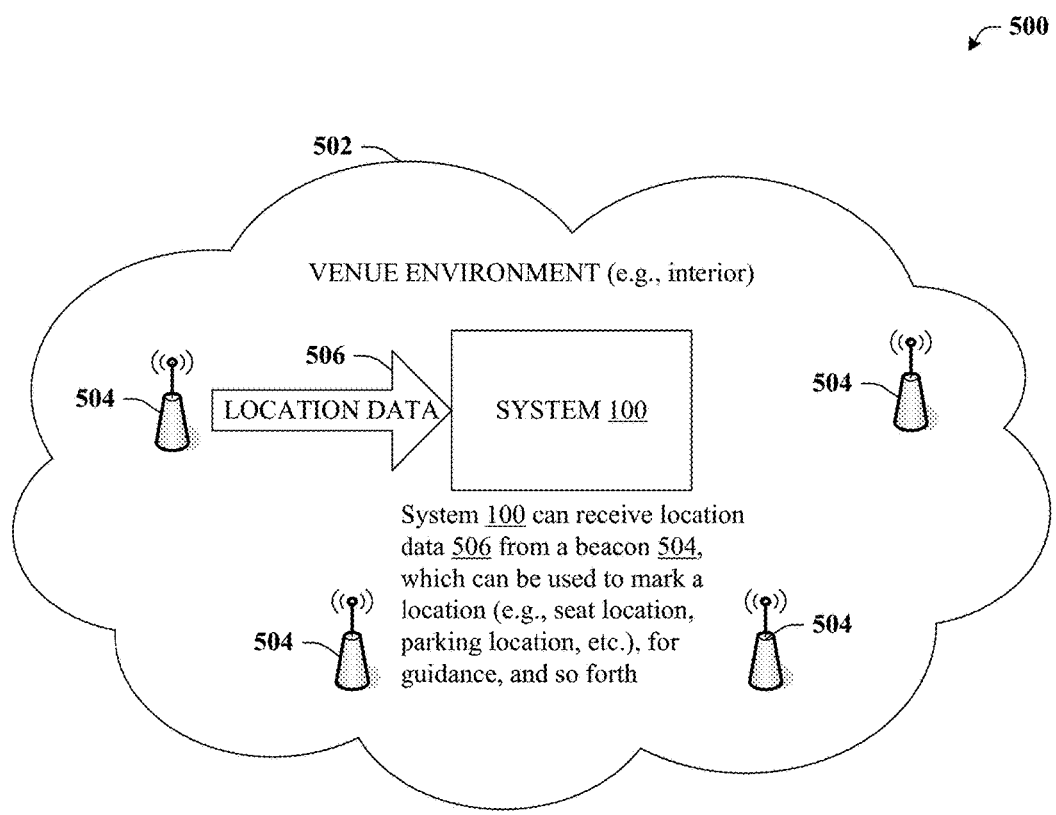
FIG. 5 illustrates a block diagram of a system that can facilitate provision of venue-specific location data that can be utilized by a wide-range of attendee devices in accordance with certain embodiments of this disclosure.

With reference now to FIG. 5, system 500 is depicted. System 500 can facilitate provision of venue-specific location data that can be utilized by a wide-range of attendee devices, even those not equipped with other location-based services hardware such as GPS or the like. For example, a venue environment 502 can be populated with numerous transmitters 504. Venue environment 502 can represent the interior of the venue (e.g., accessed via point of ingress 108), but in some embodiments can include the exterior of the venue, such as a venue parking lot. Transmitters 504 can be substantially similar to transmitter 212. For example, location data 506 can be transmitted to system 100 by some means, which can be a broadcast of sound and can be configured for a specific detection range and encoded with location data 506. Upon receiving location data 506, system 100 can be apprised of a current location, generally one that is venue-specific such as near public restrooms or parking lot 12. Location data 506 can be stored and recalled later for various purposes such as for memorial purposes (e.g., the route I took upon entering the stadium for game 6 of the World Series), reminder purposes (e.g., parking location reminder), etc.

Location data 506 can also be utilized in connection with guidance or navigation or for proximity-based alerts (e.g., "vendor 20 feet to the north is offering a free hot dog to attendees" or "please avoid the current route due to a medical emergency"). Location data 506 can relate to permanent or fixed locations (e.g., restrooms) as well as transient or event-specific locations. For example, location data 506 can be employed in connection with pre-event festivities, wherein a particular location is associated with service or other element only during a determined period of time (e.g., only during the pre-event festivities, but not thereafter).

Figure 6:
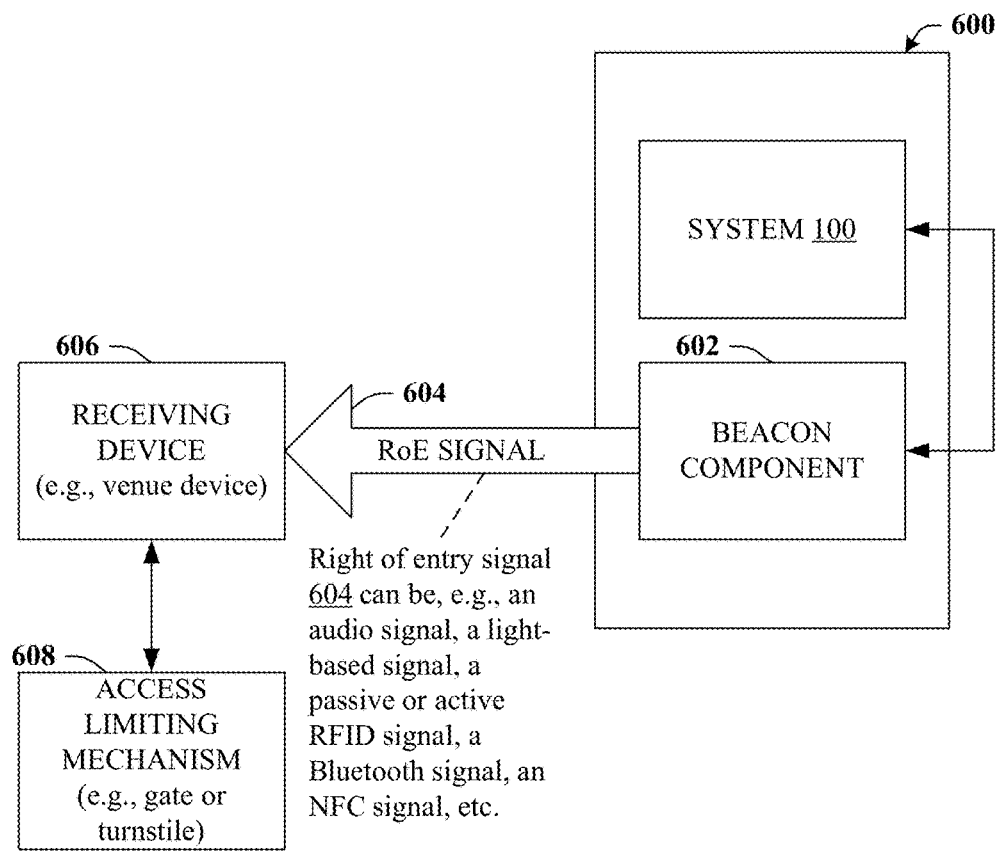
FIG. 6 illustrates a block diagram of a system that can provide for the attendee device operating as a transmitter, which can facilitate additional aspects of scannerless entry in accordance with certain embodiments of this disclosure.

Referring now to FIG. 6, system 600 is illustrated. System 600 can provide for the attendee device 120 operating as a transmitter, which can facilitate additional aspects of scannerless entry. For example, in various embodiments detailed supra, although guest services representatives are not required to scan ticket data, these guest services representatives still function to check that verification data 118 is being presented by the attendee device. Further efficiencies can be achieved by removing such a check from the process of entry to the venue. Such can be accomplished by system 600 that can include all or portions of system 100 and further include beacon component 602.

Beacon component 602 can be configured to facilitate transmission of a right of entry signal 604 to receiving device 606 associated with the venue. For example, once proximity data 104 is triggered (e.g., based on an indication of proximity to point of ingress 108), ticket data 112 can be validated and/or redeemed. Thereafter, rather than (or in addition to) causing user interface 116 to display indicia associated with verification data 118, beacon component 602 can facilitate transmission of right of entry signal 604. Upon receipt of right of entry signal 604 by receiving device 606, access limiting mechanism (e.g., a gate, turnstile, or the like) can be instructed to allow entry.

As with other signals detailed herein, right of entry signal 604 can be an audio signal, an optical signal, or based on a communication network. Audio signals can be advantageous because they do not require sophisticated or expensive equipment to be included in attendee device, are not subject to network overload conditions, and can be readily configured for a very small range such that interference can be mitigated and/or to ensure the signal is coming from one very close to receiving device 606.

In some embodiments, right of entry signal 604 can be provided based on passive transmission techniques. For example, an RFID dot can be adhered to attendee device. When exposed to an active RFID signal potentially included in or proximal to receiving device 606, the RFID dot responds with right of entry signal 604. In this case, right of entry signal 604 can include an identification associated with the attendee that can be verified in connection with allowing entry to the venue. In some embodiments, right of entry signal 604 can be transmitted according to active techniques, and such might utilize RFID technologies, Bluetooth technologies, or be transmitted according to other wireless communication standards.

Figure 7:
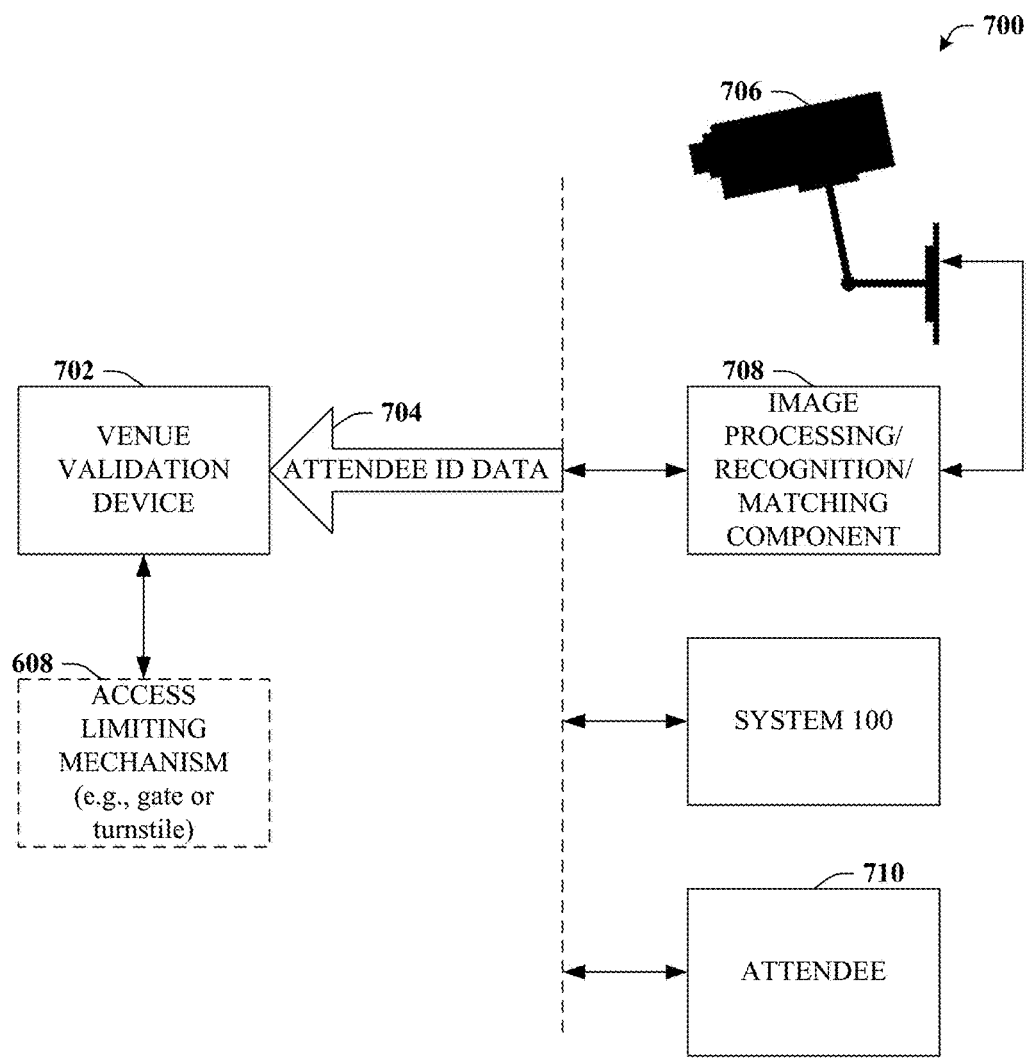
FIG. 7 illustrates a block diagram of an example system that can provide for facilitating scannerless entry to a venue based on attendee identification data in accordance with certain embodiments of this disclosure.

Referring to FIG. 7, system 700 is provided. System 700 can provide for additional features or aspects in connection with facilitating scannerless entry to a venue. In this example, system 700 can include venue validation device 702 that can be configured to validate attendee ID data 704. For example, when an attendee passes through point of ingress 108, venue validation device 702 can receive attendee ID data 704, then determine, based on this ID data that the attendee has a privilege to enter. If so, the attendee can be allowed entry. If not, attendee entrance can be restricted. Restricting access can be effectuated by access limiting mechanism 608 or by guest services representatives stationed at point of ingress 108. However, in the latter case, these guest services representatives need not employ scanners or even interact with the majority of attendees, but rather, only confront attendees for which attendee ID data 704 was not successfully verified.

Attendee ID data 704 can be received in a variety of ways. As one example, attendee device 120 and/or system 100 can transmit attendee ID data 704 according to substantially any technique described herein or otherwise suitable. Attendee ID data 704 can relate to a visual image, voice signatures or other signatures, an audio-based signal or watermark, device ID, individual ID, biometric data such as a fingerprint, retina, or DNA, etc. Thus, such attendee ID data 704 can be supplied by system 100 or directly by the attendee 710 (e.g., speaking into a microphone for a voiceprint, providing a fingerprint, etc.).

Additionally or alternatively, point of ingress 108 can be equipped with imaging devices 706, which can include microphones or other sensor devices. These devices 706 can capture an image (or voiceprint) of a potential attendee. Associated data can be provided to component 708 that can perform image processing as well as recognition techniques such as facial recognition, voice recognition or the like and matching processes. Such can be utilized to identify the attendee, and such information can be transmitted to venue validation device 702 in the form of attendee ID data 704. Advantageously, attendee ID data 704 can be further utilized for purposes of commemoration (e.g., images of attendee at the venue can be provided to the attendee for memorializing the occasion); marketing, rewards, or incentives; security; and so on.

Example Methods for Scannerless Venue Entry and Location Techniques

Figure 8:
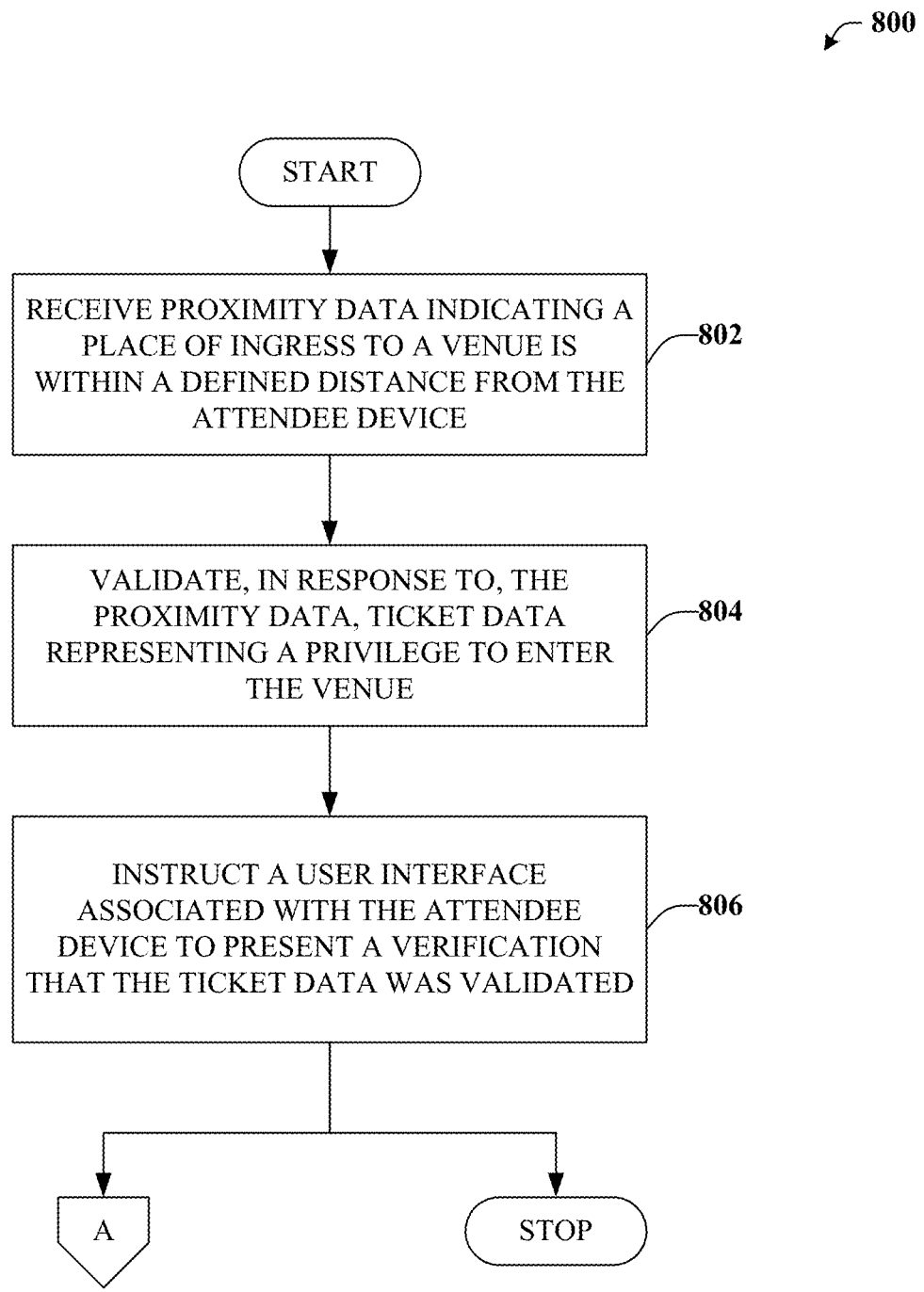
FIG. 8 illustrates an example methodology that can provide for scannerless venue entry in accordance with certain embodiments of this disclosure.
Figure 9:
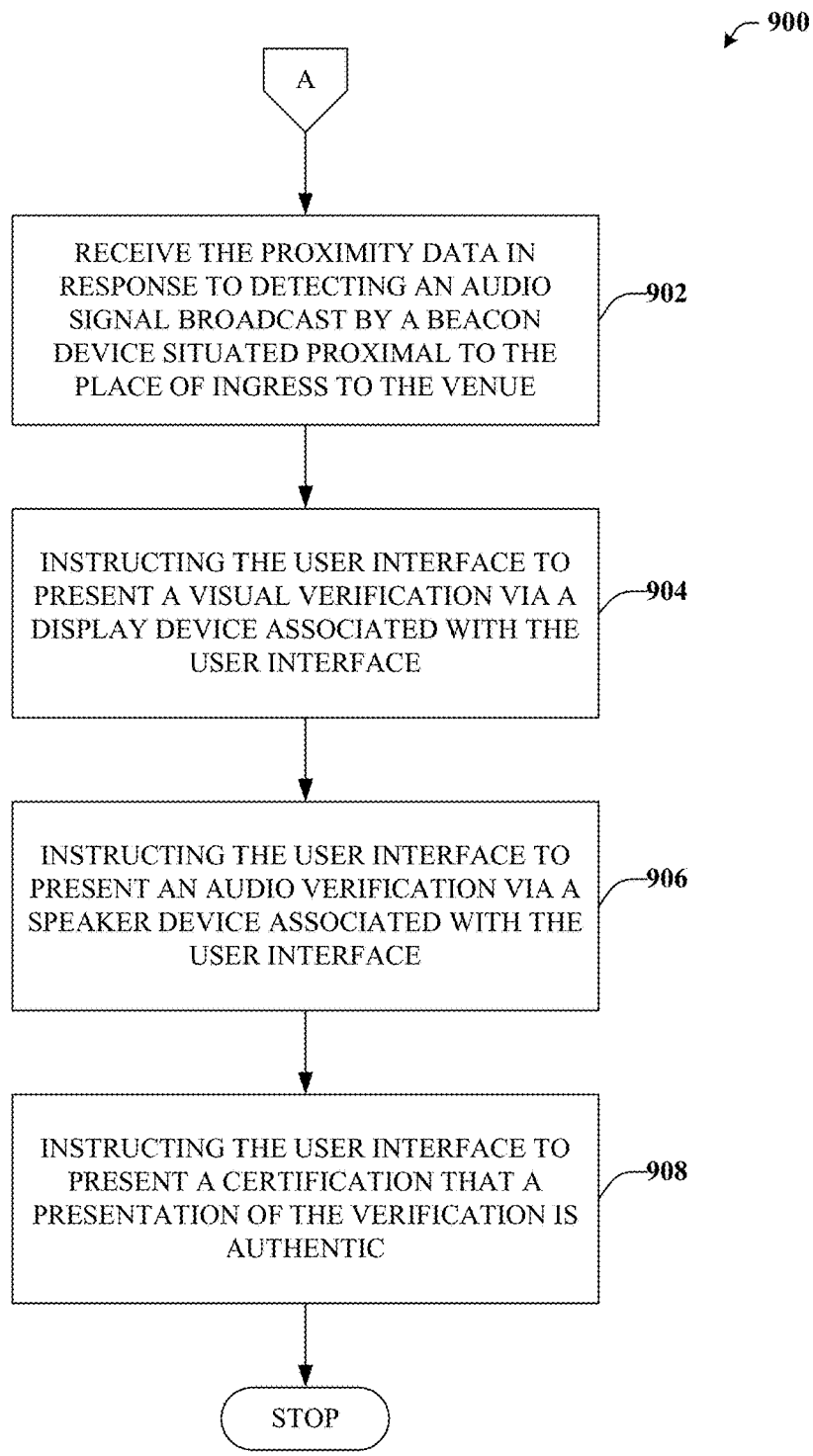
FIG. 9 illustrates an example methodology that can provide for additional features or aspects in connection with providing scannerless venue entry and audio-based location techniques in accordance with certain embodiments of this disclosure.

FIGS. 8 and 9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 8 illustrates exemplary method 800. Method 800 can provide for scannerless venue entry. For example, at reference numeral 802, proximity data indicating a place of ingress to a venue is within a defined distance from the attendee device can be received. For example, proximity data can be received in response to user input, wherein the user indicates he or she is near to the place of ingress. As another example, proximity data can be received in response to receipt or detection of a signal broadcast by a transmitter situated at or near the place of ingress or elsewhere.

At reference numeral 804, ticket data representing a privilege to enter the venue can be validated. Validation of the privilege to enter the venue can be validated in response to receiving the proximity data. Put another way, a ticket purchased by an attendee can be redeemed in response to an indication that the attendee is near to the place of entry to the venue.

At reference numeral 806, e.g., in response to redeeming the ticket, a user interface associated with the attendee device can be instructed to present a verification that the ticket data was validated and/or redeemed. In other words, once the ticket is redeemed, the user interface can display (or otherwise present) indicia that can inform to this effect: that a valid ticket has been redeemed for this attendee. Accordingly, the attendee can present the display to a guest services representative, who can observe the verification being displayed and allow entry to the venue without the need to employ scanning procedures.

In some embodiments, multiple tickets can be redeemed collectively, for instance, by a single attendee device. For instance, five tickets can be redeemed for a family of five, and a single attendee device can be configured to display associated indicia. Such indicia might include a number (e.g., "5"), images of the family members, or any suitable indicia to inform the guest services representative and/or authenticate that all five individuals have a privilege of entry to the venue. In some embodiments, the attendee device can specify how many tickets of a set of multiple tickets and/or which specific tickets from the set to redeem. For example, three members of the family of five might arrive at point of ingress at an earlier time than the other two. Accordingly, the attendee device can request input such as providing a display that verifies whether all five tickets should be redeemed. In response input can be received indicating that only three of the five tickets (e.g., by pressing the number 3) should be redeemed.

It is understood that multiple ticket redemption can provide additional convenience for attendees, but also might be beneficial in situations in which some of the attendees do not possess a suitable device. As described supra, the attendee device can present verification data. In some embodiments, seat locator data or other access privilege data can be presented, such as, e.g., to gain access to interior or restricted portions of the venue. However, attendees without a suitable device (e.g., one or more of the family of five) will not typically be able to accomplish such. In this regard, in some embodiments, seat locator data can be printed by a device at the point of ingress for all or a portion of the five-member family. In cases where the attendee does not have access to a suitable device, this seat locator stub can be presented (e.g., to ushers in the interior of the venue), but otherwise, such can be presented by the attendee device. In some embodiments, a special-purpose entry lane can be provided for multiple ticket redemption. This special-purpose entry lane can automatically print seat locator stubs (or other suitable information) for some portion of the group of individual attendees that collectively redeemed tickets. These seat locator stubs might be printed for all members of the group other than the primary (e.g., the attendee device that redeemed tickets for the group), or only for members in which no associated device is detected.

FIG. 9 illustrates exemplary method 900. Method 900 can provide for additional features or aspects in connection with providing scannerless venue entry and audio-based location techniques. For instance, at reference numeral 902, the proximity data (e.g., received in connection with reference numeral 802 of FIG. 8) can be received in response to detecting an audio signal broadcast by a transmitter device situated proximal to the place of ingress.

Reference numerals 904 and 906 can relate to the instructions transmitted to the user interface detailed in connection with reference numeral 806 of FIG. 8. At reference numeral 904, the user interface can be instructed to present a visual verification via a display device associated with the user interface. This visual verification can be text or a particular image and can be configured for rapid verification by, e.g., a guest services representative stationed at the place of ingress.

At reference numeral 906, the user interface can be instructed to present an audio verification via a speaker device associated with the user interface. This audio verification can be part of a musical composition, an oration, or another sound. As with the visual verification detailed at reference numeral 906, the audio verification can be configured for rapid verification by, e.g., a guest services representative stationed at the place of ingress. For instance, the audio verification can be a very distinctive voice, or a distinctive portion of a musical composition or the like.

At reference numeral 908, the user interface can be instructed to present a certification that a presentation of the verification is authentic. This certification can be a defined background or other image, possibly including a watermark, certificate of authentication (COA), a code of the day, etc. In cases of an audio presentation, the verification can take the form of an audio watermark or an audio COA.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
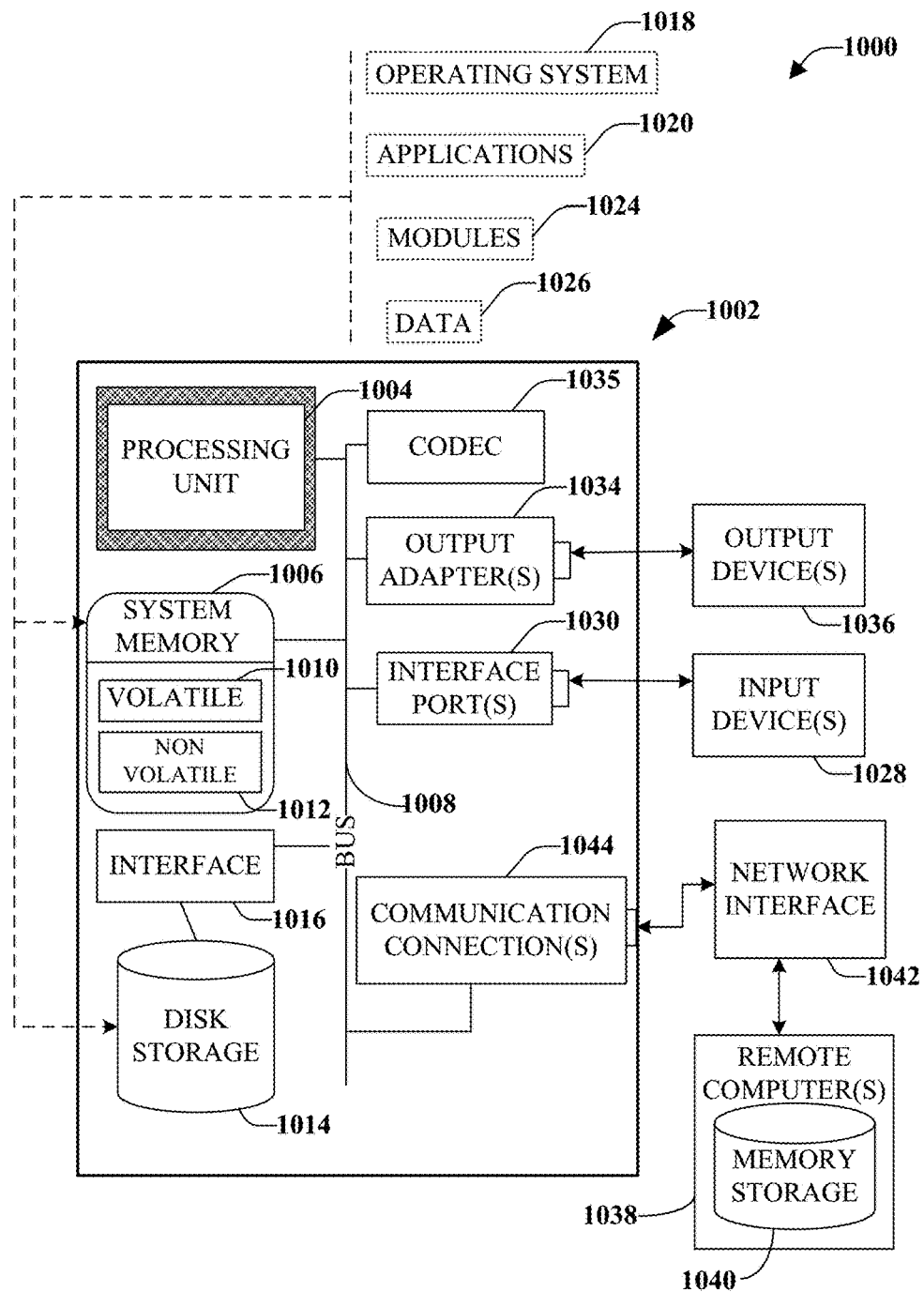
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 1006 includes volatile memory 109 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012 or included in other components detailed herein. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 109 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to authorize having such information collected and/or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
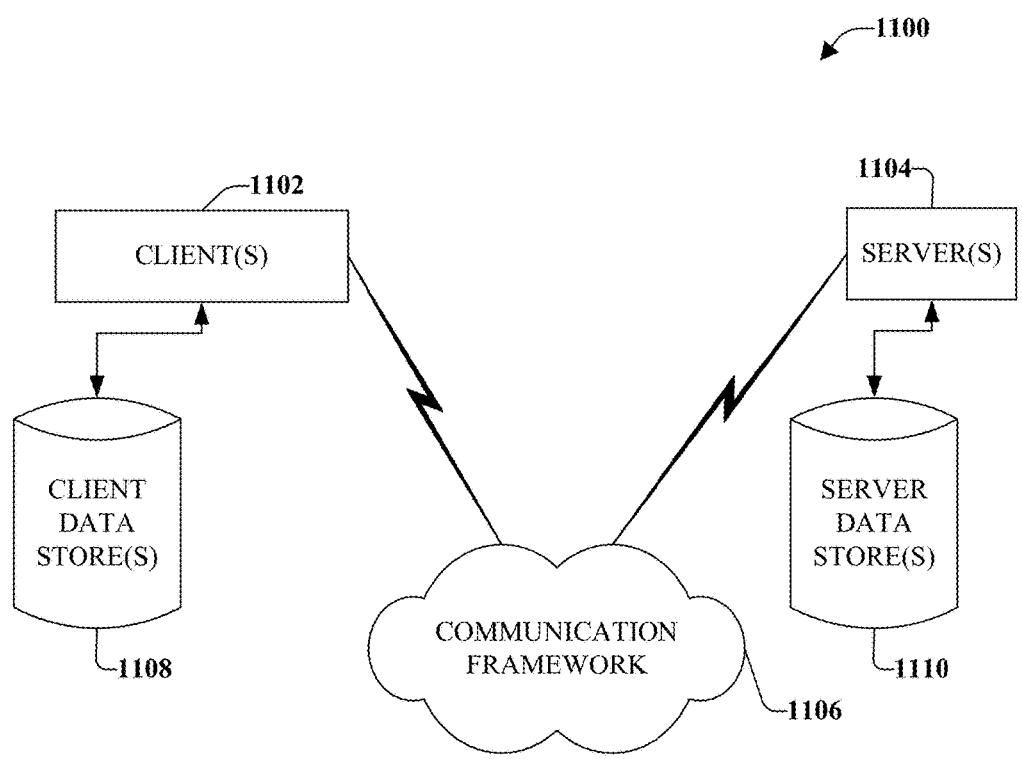
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. An attendee device, comprising:
 a memory to store computer executable components; and
 a processor that executes the following computer executable components stored in the memory:
  a communication component that receives ticket data indicative of a privilege to enter a venue;
  a redemption component that performs a self-validation procedure in which the attendee device validates the ticket data and, in response to the ticket data being validated, generates at least a portion of verification data that is representative of an indication the ticket data was validated;
  a proximity component that determines whether the attendee device is within a defined distance range from a point of ingress to the venue in which entry is challenged in response to the verification data not being presented by a user interface of the attendee device; and
  a presentation component that instructs the user interface of the attendee device to present the verification data in response to one or more conditions being determined to be met, wherein a first condition of the one or more conditions is the proximity component has determined that the attendee device is within the defined distance range.

2. The attendee device of claim 1, wherein the proximity component determines the system is within the defined distance range in response to input to the user interface that indicates the system is within the defined distance range.

3. The attendee device of claim 1, wherein the proximity component determines the system is within the defined distance range in response to detection of an acoustic signal from a transmitter of the venue.

4. The attendee device of claim 3, wherein the communication component receives a second portion of the verification data in response to the one or more conditions being determined to be met.

5. The attendee device of claim 1, wherein the privilege to enter the venue is in connection with a specific event being held at the venue, and wherein the proximity component determines a current time is within a defined temporal range of a time associated with the event.

6. The attendee device of claim 5, wherein a second condition of the one or more conditions is the proximity component has determined the current time is within the defined temporal range.

7. The attendee device of claim 1, wherein the self-validation procedure comprises an attendee device comprising the redemption component validating the ticket data without the ticket data being scanned by a venue device at the point of ingress.

8. The attendee device of claim 1, wherein the verification data presented by the user interface relates to visual indicia.

9. The attendee device of claim 1, wherein the verification data presented by the user interface relates to acoustic indicia.

10. The attendee device of claim 1, wherein the presentation component instructs the user interface to present certification data in conjunction with presentation of the verification data, wherein the certification data represents a certification the verification data is authentic.

11. The attendee device of claim 1, wherein the proximity component further receives location data that represents a current location of the system and a target location associated with a defined destination.

12. The attendee device of claim 1, further comprising a beacon component that facilitates transmission of a right of entry signal to a device associated with the venue, wherein the right of entry signal encodes information that indicates a privilege to enter the venue.

13. The system attendee device of claim 12, wherein the right of entry signal is at least one of an audio signal, an active radio frequency identification (RFID) signal, a passive RFID signal triggered in response to an active RFID signal received from a device associated with the venue, a Bluetooth signal, or a near field communication (NFC) signal.

14. The attendee device of claim 1, wherein the point of ingress relates to at least one of: ingress to the venue, ingress to a portion of the venue, or ingress to a parking area associated with the venue.

15. The system attendee device of claim 1, further comprising a beacon component that, in response to the privilege to enter being validated, transmits a right of entry signal to a receiving device associated with the venue.

16. The system attendee device of claim 15, wherein the receiving device facilitates presentation of indicia indicating the privilege to enter was validated.

17. The attendee device of claim 15, wherein the receiving device instructs an access limiting mechanism to grant access.

18. A method, comprising:
 employing a computer-based processor included in an attendee device to execute computer executable components stored in a memory to perform the following:
  receiving ticket data representing a privilege to enter a venue hosting an event;
  performing a self-validation procedure that validates the ticket data;
  generating at least a portion of verification data that indicates the ticket data was validated and the privilege to enter the venue is authorized;
  determining a place of ingress to the venue is within a defined distance from the attendee device, wherein the place of ingress is a scannerless place of ingress that does not require ticket data to be examined and wherein entry to the venue is challenged without a presentation of the verification data; and instructing a user interface of the attendee device to present the verification data, wherein the instructing is triggered in response to a determination that at least one condition has been satisfied, wherein the at least one condition comprises a first condition that attendee device is within the defined distance from the place of ingress.

19. The method of claim 18, wherein the receiving proximity data is in response to detecting an acoustic signal broadcast by a transmitter device situated proximal to the place of ingress.

20. The method of claim 18, wherein the instructing the user interface comprising instructing the user interface to present a visual verification via a display device of the user interface.

21. The method of claim 18, wherein the instructing the user interface comprising instructing the user interface to present an acoustic verification via a speaker device of the user interface.

22. The method of claim 18, further comprising instructing the user interface to present a certification that a presentation of the verification is authentic.

23. A non-transitory computer readable storage medium storing computer-executable instructions that, in response to execution, cause an attendee device including a processor to perform operations, comprising:

receiving ticket data representative of a privilege to enter a venue;

determining a point of ingress to the venue is within a defined distance, wherein entry to the venue is challenged in response to verification data verification data not being presented;

redeeming the ticket data according to a self-redemption procedure by which the attendee device validates the privilege to enter the venue without the ticket data being scanned at the point of ingress by a venue device, wherein the self-redemption procedure is triggered in response to the determining the point of ingress is within the defined distance; and instructing a user interface associated with the attendee device to present the verification data representing a verification that the ticket data was redeemed.

24. The non-transitory computer readable storage medium of claim 23, wherein the determining the point of ingress is within the defined distance is in response to detection of an acoustic signal transmitted by a transmitter device associated with the venue.

25. The non-transitory computer readable storage medium of claim 23, wherein the verification data comprises visual indicia suitable for presentation by a display device of the user interface.

26. The non-transitory computer readable storage medium of claim 23, wherein the verification data comprises acoustic indicia suitable for presentation by a speaker device of the user interface.

* * * * *

UNITED STATES PATENT AND TRADEMARK OFFICE
CERTIFICATE OF CORRECTION

PATENT NO. : 10,109,125 B1
APPLICATION NO. : 15/434631
DATED : October 23, 2018
INVENTOR(S) : Samuel Gerace et al.

Page 1 of 1

It is certified that error appears in the above-identified patent and that said Letters Patent is hereby corrected as shown below:

In the Specification

On Column 1, Line 59: Change "validated" to --validated.--.

On Column 5, Line 2: Change "approaches" to --approaches.--.

In the Claims

On Column 18, Line 24: In Claim 10, after "certification" insert --that--.

On Column 18, Line 34: In Claim 13, change "system attendee" to --attendee--.

On Column 18, Line 45: In Claim 15, change "system attendee" to --attendee--.

On Column 18, Line 49: In Claim 16, change "system attendee" to --attendee--.

On Column 20, Line 5: In Claim 23, change "verification data verification data" to --verification data--.

Signed and Sealed this
Fifth Day of February, 2019

Andrei Iancu
*Director of the United States Patent and Trademark Office*